US012581369B2

(12) United States Patent
Kaushik et al.

(10) Patent No.: US 12,581,369 B2
(45) Date of Patent: Mar. 17, 2026

(54) OPTIMIZED REGISTRATION AND DEREGISTRATION MESSAGING TO THE UDM

(71) Applicant: T-Mobile USA, Inc., Bellevue, WA (US)

(72) Inventors: Subramania Kaushik, Bellevue, WA (US); Anil Kumar Mariyani, Ashburn, VA (US); Chris Jensen, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 307 days.

(21) Appl. No.: 18/446,787

(22) Filed: Aug. 9, 2023

(65) Prior Publication Data

US 2025/0056333 A1     Feb. 13, 2025

(51) Int. Cl.
*H04W 36/00* (2009.01)
*H04W 60/06* (2009.01)
*H04W 68/00* (2009.01)

(52) U.S. Cl.
CPC ..... *H04W 36/00222* (2023.05); *H04W 60/06* (2013.01); *H04W 68/00* (2013.01)

(58) Field of Classification Search
None
See application file for complete search history.

(56) References Cited

U.S. PATENT DOCUMENTS 11,818,578  B2     11/2023  Li et al.
2019/0007500  A1     1/2019  Kim et al.

| | | |
|---|---|---|
| 2019/0053295 A1 | 2/2019 | Castellanos Zamora et al. |
| 2019/0174449 A1 | 6/2019 | Shan et al. |
| 2019/0199802 A1 | 6/2019 | Zhu et al. |
| 2019/0230556 A1 | 7/2019 | Lee |
| 2020/0084675 A1 | 3/2020 | Lu et al. |
| 2021/0029603 A1 | 1/2021 | Kim et al. |
| 2021/0105847 A1 | 4/2021 | Prabhakar et al. |
| 2021/0385625 A1 | 12/2021 | Qiao et al. |
| 2022/0167244 A1 | 5/2022 | Zaus et al. |
| 2022/0201638 A1 | 6/2022 | Arrobo Vidal et al. |

(Continued)

OTHER PUBLICATIONS

3GPP; TSG SA, "Procedures for the 5G Systems (5GS); Stage 2 (Release 18)", 3GPP TS 23.502, vol. 18.2.0, Jun. 29, 2023.

(Continued)

*Primary Examiner* — Nishant Divecha
(74) *Attorney, Agent, or Firm* — Lee & Hayes, P.C.

(57) ABSTRACT

An access and mobility management function (AMF) and a unified data management node (UDM) described herein are configured to refrain from sending messages between each other in the contexts of handovers between 4G (fourth generation) and 5G (fifth generation) technologies and of initial registration on 5G. During a handover from 5G to 4G, the UDM sets a 5G registration status to not active and refrains from sending a deregistration notification to the AMF. During a handover from 4G to 5G that is not an initial registration, the AMF refrains from sending get messages and subscribe messages to the UDM but receives updates to subscriber profile information from the UDM. Further, during an initial 5G registration, the AMF refrains from sending subscribe messages to the UDM but receives updates to subscriber profile information from the UDM.

8 Claims, 8 Drawing Sheets

(56)         References Cited

U.S. PATENT DOCUMENTS

| | | | |
|---|---|---|---|
| 2022/0338099 A1 | 10/2022 | Zhu et al. | |
| 2022/0386399 A1 | 12/2022 | Huang et al. | |
| 2022/0394566 A1 | 12/2022 | Liu et al. | |
| 2022/0408395 A1 | 12/2022 | Li et al. | |
| 2022/0408397 A1 | 12/2022 | Zhu et al. | |
| 2023/0189194 A1* | 6/2023 | Ayers ................... | H04W 60/06 |
| | | | 370/331 |
| 2024/0121588 A1* | 4/2024 | Tian ....................... | H04W 8/06 |
| 2024/0205863 A1* | 6/2024 | Nassar ................. | H04W 60/04 |
| 2025/0048075 A1 | 2/2025 | Kaushik | |
| 2025/0048302 A1 | 2/2025 | Kaushik | |

OTHER PUBLICATIONS

Nokia, et al., "AMF to indicate the capability of supporting non-3GPP access path switching", C1-232484, 3GPP TSG-CT WG1, Meeting #141-e, Apr. 10, 2023, pp. 1-63.

Nokia, et al., "Network indication to the UE for discontinuous coverage of satellite access support", C1-232149, 3GPP TSG-CT WG1, Meeting #141-e, Apr. 10, 2023, pp. 1-62.

Sharp, et al., "Capability negotiation for Discontinuous Coverage Supported", C1-232326, 3GPP TSG-CT WG1, Meeting #141-e, Apr. 10, 2023, pp. 1-90.

Search Report and Written Opinion for International Application No. PCT/US2024/040399, Dated Nov. 13, 2024, 8 pages.

Search Report and Written Opinion for International Application No. PCT/US2024/040409, Dated Nov. 13, 2024, 9 pages.

Search Report and Written Opinion for International Application No. PCT/US24/40422, Dated Nov. 5, 2024, 9 pages.

* cited by examiner

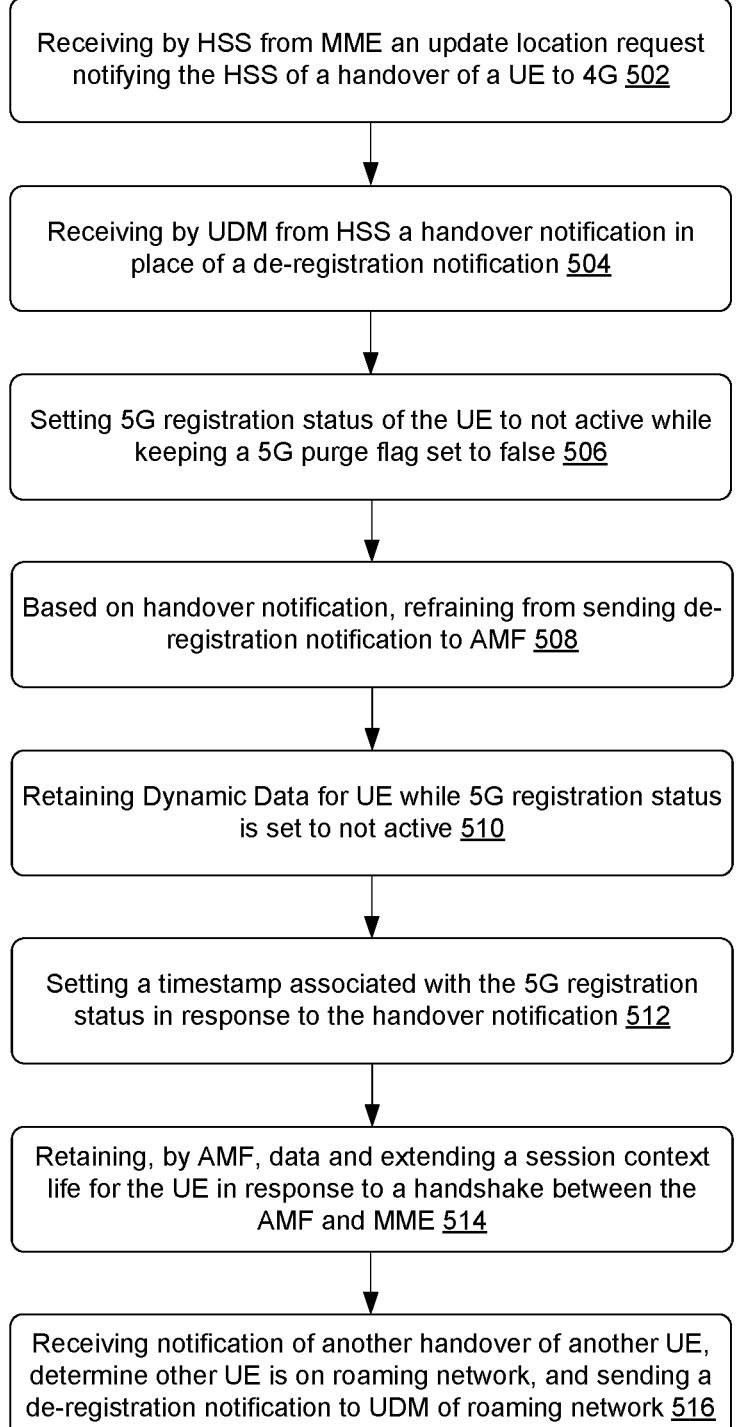

Receiving by HSS from MME an update location request notifying the HSS of a handover of a UE to 4G 502

Receiving by UDM from HSS a handover notification in place of a de-registration notification 504

Setting 5G registration status of the UE to not active while keeping a 5G purge flag set to false 506

Based on handover notification, refraining from sending de-registration notification to AMF 508

Retaining Dynamic Data for UE while 5G registration status is set to not active 510

Setting a timestamp associated with the 5G registration status in response to the handover notification 512

Retaining, by AMF, data and extending a session context life for the UE in response to a handshake between the AMF and MME 514

Receiving notification of another handover of another UE, determine other UE is on roaming network, and sending a de-registration notification to UDM of roaming network 516

FIG.5

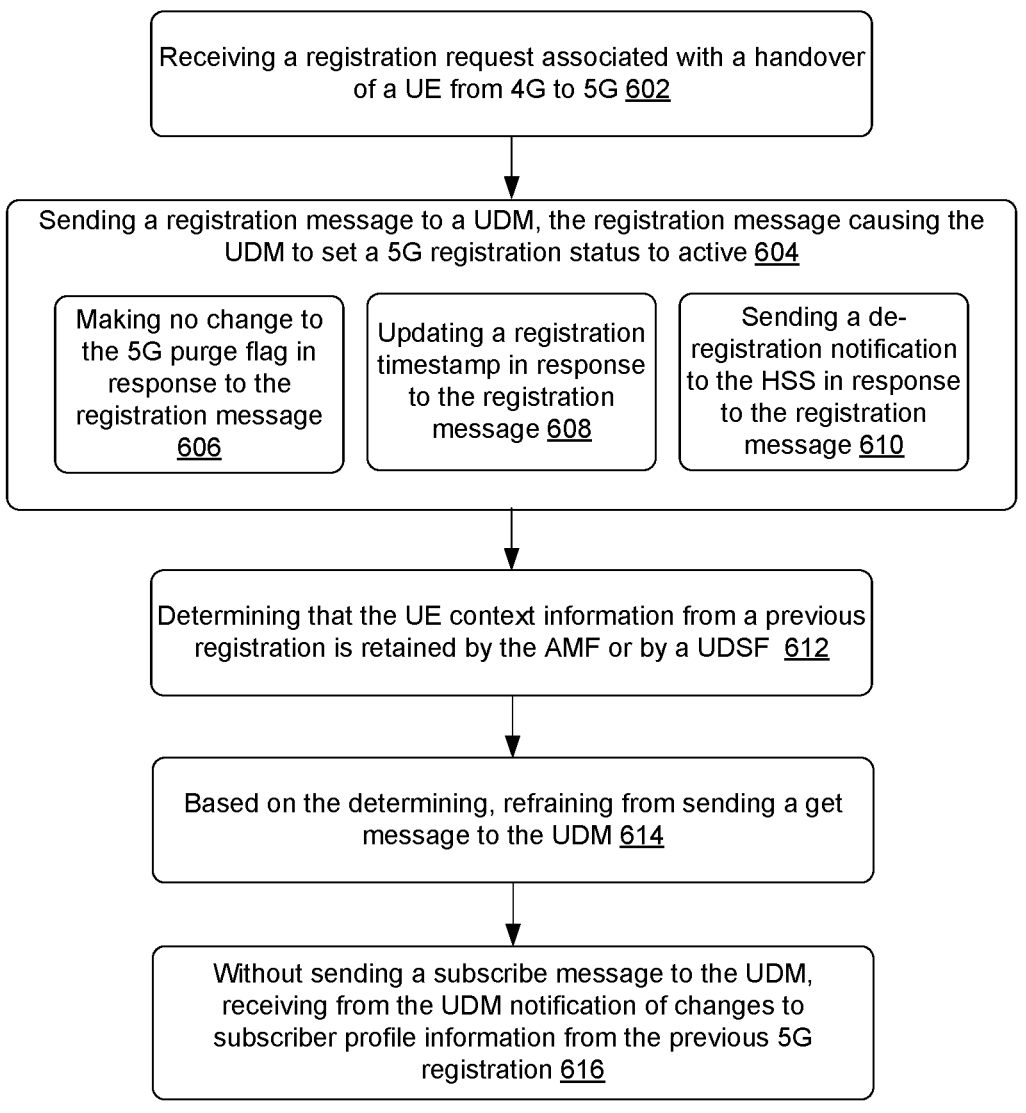

Receiving a registration request associated with a handover of a UE from 4G to 5G 602

Sending a registration message to a UDM, the registration message causing the UDM to set a 5G registration status to active 604

Making no change to the 5G purge flag in response to the registration message 606

Updating a registration timestamp in response to the registration message 608

Sending a de-registration notification to the HSS in response to the registration message 610

Determining that the UE context information from a previous registration is retained by the AMF or by a UDSF 612

Based on the determining, refraining from sending a get message to the UDM 614

Without sending a subscribe message to the UDM, receiving from the UDM notification of changes to subscriber profile information from the previous 5G registration 616

FIG. 6

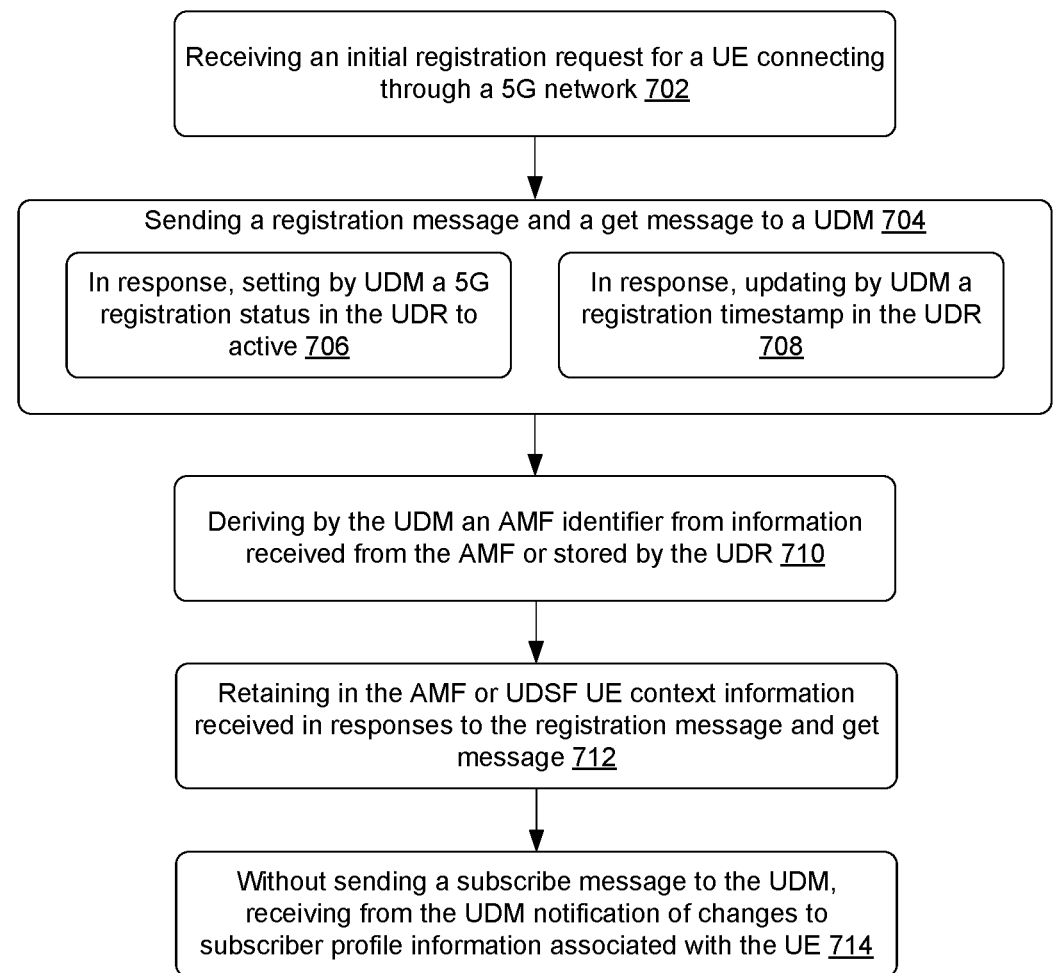

Receiving an initial registration request for a UE connecting through a 5G network 702

Sending a registration message and a get message to a UDM 704

In response, setting by UDM a 5G registration status in the UDR to active 706

In response, updating by UDM a registration timestamp in the UDR 708

Deriving by the UDM an AMF identifier from information received from the AMF or stored by the UDR 710

Retaining in the AMF or UDSF UE context information received in responses to the registration message and get message 712

Without sending a subscribe message to the UDM, receiving from the UDM notification of changes to subscriber profile information associated with the UE 714

FIG. 7

OPTIMIZED REGISTRATION AND DEREGISTRATION MESSAGING TO THE UDM

BACKGROUND

The increased availability and performance characteristics of fifth generation (5G) networks have greatly enhanced the communication experiences of users. In some environments, however, the relative capabilities of fourth generation (4G) networks and 5G networks may result in handovers from 5G to 4G and, as environment, use, and characteristics vary, handovers back from 4G to 5G. The frequency of handovers has greatly increased signaling among core network nodes, including signaling to the unified data management node (UDM) and the associated unified data repository (UDR). Handovers to 5G may result, for example, in registration messages from an access and mobility management function (AMF) to the UDM, update messages to the UDM, subscribe messages to the UDM, each of these in turn causing a request and response between the UDM and UDR. Handovers away from 5G may result in loss of information obtained by the AMF from these messages, requiring their repetition with each return to 5G.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 is a flow diagrams of an illustrative process at an AMF for suppressing deregistration messaging to 5G core network nodes and allowing retention by those nodes of information about a UE while the UE is on a 4G RAT.

FIG. 6 is a flow diagrams of an illustrative process at an AMF for optimizing messaging between the AMF and UDM, including refraining from sending both get messages and subscribe messages to the UDM in the context of a 4G to 5G handover that is not an initial registration.

FIG. 7 is a flow diagrams of an illustrative process at an AMF for optimizing messaging between the AMF and UDM, including refraining from sending subscribe messages to the UDM in the context of an initial 5G registration.

DETAILED DESCRIPTION

This disclosure is directed in part to an AMF and a UDM configured refrain from sending messages between each other in the contexts of handovers between 4G and 5G technologies and of initial registration on 5G. During a handover from 5G to 4G, the UDM sets a 5G registration status to not active buts keeps the 5G purge flag set to false and refrains from sending a deregistration notification to the AMF. During a handover from 4G to 5G that is not an initial registration, the AMF refrains from sending get messages and subscribe messages to the UDM but receives updates to subscriber profile information from the UDM. Further, during an initial 5G registration, the AMF refrains from sending subscribe messages to the UDM but receives updates to subscriber profile information from the UDM.

Figure 1:
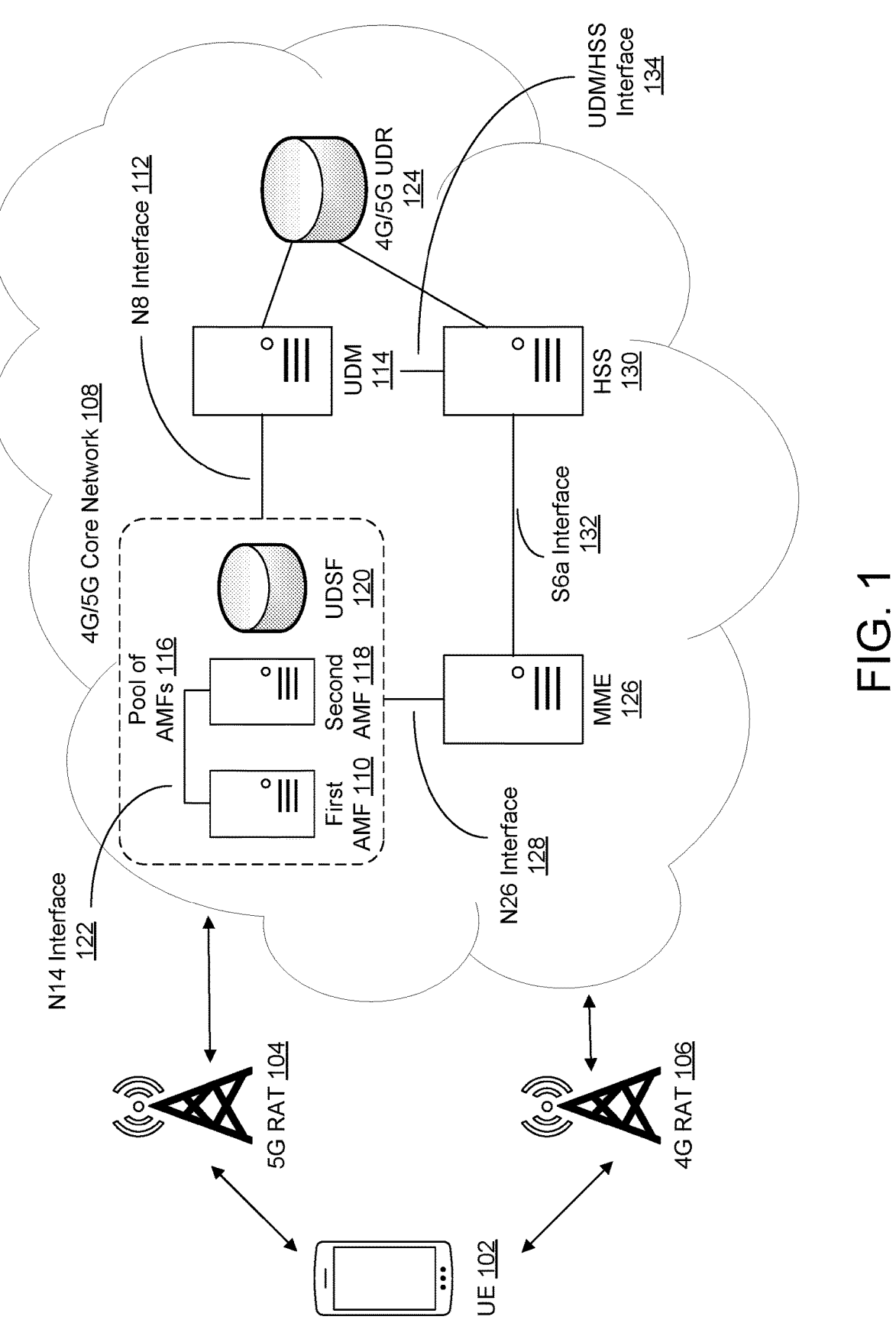
FIG. 1 is a diagram of a telecommunication network having a combined 4G/5G core network ("core network") and 4G and 5G radio access technologies (RATs) available to user equipment (UE) via access networks, the nodes of the core network engaging in signaling and data retention to handle handovers in a manner that optimizes user experience and resource usage.

FIG. 1 is a diagram of a telecommunication network having a combined 4G/5G core network ("core network") and 4G and 5G RATs available to UEs via access networks, the nodes of the core network engaging in signaling and data retention to handle handovers in a manner that optimizes user experience and resource usage. As illustrated, a UE 102 may connect to a 5G RAT 104 or a 4G RAT 106 of one or more access networks and may be directed from one to the other through handover operations. The base station(s) implementing the RATs 104 and 106 may in turn be connected to a combined 4G/5G core network 108 ("core network 108"). The core network 108 may include a first AMF 110 connected to a UDM 112 via an N8 interface 114. The first AMF 110 may be part of a pool 116 of AMFs, the pool 116 also including a second AMF 118 and an unstructured data storage function (UDSF) 120. The AMFs 110 and 118 of the pool 116 may also be connected via N14 interfaces 122, enabling handovers among the AMFs 110 and 118 of the pool 116. The UDM 112 may be connected to a UDR 124, the UDR 124 serving as a common storage repository for 5G and 4G elements of the core network 108. The core network 108 may also include a mobility management entity (MME) 126, which may communicate with the AMFs 110 and 118 through an N26 interface 128 to facilitate 4G/5G handovers. The MME 126 may be connected to a home subscriber server (HSS) 130, the HSS 130 accessing the UDR 124 and managing the data therein in an analogous manner to the UDM 112. The MME 126 and HSS 130 may be connected via a S6a interface 132. Lastly, there may be an interface 134 between the UDM 112 and HSS 130.

The UE 102 may be any sort of UE, such as a cellular phone, a mobile device, an Internet-of-Things device (such as a watch, goggles, or other wearable device), a tablet computer, a personal computer (PC), or any sort of device capable of wireless connectivity to one or more access points and of being moved from location to location.

In various implementations, the 5G RAT 104 may be implemented by a gNode B (gNB)—a 5G base station. The 4G RAT 106 may be implemented by an eNode B (eNB)—a 4G/Long Term Evolution (LTE) base station. The gNB and eNB may be co-located at a same cell site or at different cell sites and may each, through its respective 5G RAT 104 or 4G RAT 106, offer connectivity to the UE 102 and any other UEs in proximity and capable of connecting to that radio access technology. Based on factors such as the location of the UE 102, the number of UEs utilizing the spectrum of the radio access technology, and the types of services those UEs are using, either of the 5G RAT 104 or the 4G RAT 106 may offer a better user experience at a different point in time, leading to handovers of the UE 102 between the 5G RAT 104 and 4G RAT 106. The rules and thresholds governing the handovers may in some circumstances lead to frequent handovers. These frequent handovers in turn result in an increased signaling burden on the core network 108.

In some implementations, the core network 108 includes nodes and devices from both 4G core networks and 5G core networks. As shown, the core network 108 includes at least AMFs 110 and 118, UDSF 120, UDM 112, UDR 124, MME 126, and HSS 130. The core network 108 may also include serving gateways (SGw), packet data network gateways (PGw), session management functions (SMF), user plane function (UPF), policy control function (PCF), or one or more nodes of an Internet protocol multimedia subsystem (IMS), such as a call session control function (CSCF) and its nodes (proxy CSCF (P-CSCF), interrogating CSCF (I-CSCF), and serving CSCF (S-CSCF)) or a policy and charging rule function (PCRF). The different ones among the 4G core network nodes and 5G core network nodes may support their respective, corresponding one of the 4G RAT 106 and 5G RAT 104 and, to support handovers, may communicate with each other over interfaces (e.g., the N26 interface 128 between the AMFs 110/118 and the MME 126).

In various implementations, the first AMF 110 ("AMF 110") and second AMF 118 ("AMF 118") may belong to a same pool 116 of AMFs, which may be associated with a physical location/region. The AMFs of pool 116, including AMF 110 and AMF 118 may maintain their own storage and shared information (e.g., via the N14 interface 122), may utilize a common UDSF 120 to store shared information for the AMFs, or some combination of these approaches. The N14 interface 122 may also be used for handovers between the AMFs, such as between AMF 110 and AMF 118, in which the AMF receiving the handover may receive information stored by the old AMF, by the UDSF, or both. The AMF 110/118 for a given UE, such as UE 102, may receive connection and session related information for the UE, handle connection and mobility management tasks, and forward information for session management to an SMF.

Additionally, the AMF 110 or 118 sends messages to UDM 112 over the N8 interface 114 (for further discussion of FIG. 1, AMF 110 will be referred to, but with the understanding that what is said of AMF 110 may apply to AMF 118 or any other AMF of the pool 116 of AMFs). Some of these messages over the N8 interface 114 are generated as part of handovers between 4G and 5G of between AMFs, and with frequent handovers, a substantial volume of messages can be generated and impact performance of the AMF 110 and UDM 112. Additional details of such messaging are shown in FIGS. 2-7 and described further herein with reference to those figures and in other discussions.

In some implementations, the UDM 112 serves as front-end for user subscription data stored in the UDR 124 to other 5G nodes of the core network 108. The messages through which the UDM 112 requests information and receives it in response from the UDR 124 may conform to a lightweight directory access protocol (LDAP). The UDR 124 serves as the centralized repository of information for the core network 108, storing subscriber profile information, policy data, structured data, application data, etc. In some implementations, in core network 108, the UDR 124 may serve as the centralized repository of information for both 5G nodes (through UDM 112) and 4G nodes (through HSS 130).

In various implementations, the MME 126 provides session management and supports subscriber authentication, roaming, and handovers related to UEs connected to 4G RAT 106. To support handovers from 4G to 5G and from 5G to 4G, the MME 126 may communicate with AMF 110 through an N26 interface 128 between the MME 126 and AMF 110. Also, to provide and receive subscriber information to/from HSS 130, the MME may communicate with the HSS 130 via a S6a interface 132. Information such as authentication, location, and service information may be communicated over the S6a interface 132.

The HSS 130 is the subscriber information database for 4G nodes of core network 108 and either mirrors the UDR 124 or serves as a front end to the UDR 124 for the 4G nodes. In the context of handovers, it may also communicate with the UDM 112 over an interface 134, which may be a proprietary interface or an interface in accordance with standards, such as those of the Third Generation Partnership Project (3GPP).

Figure 2:
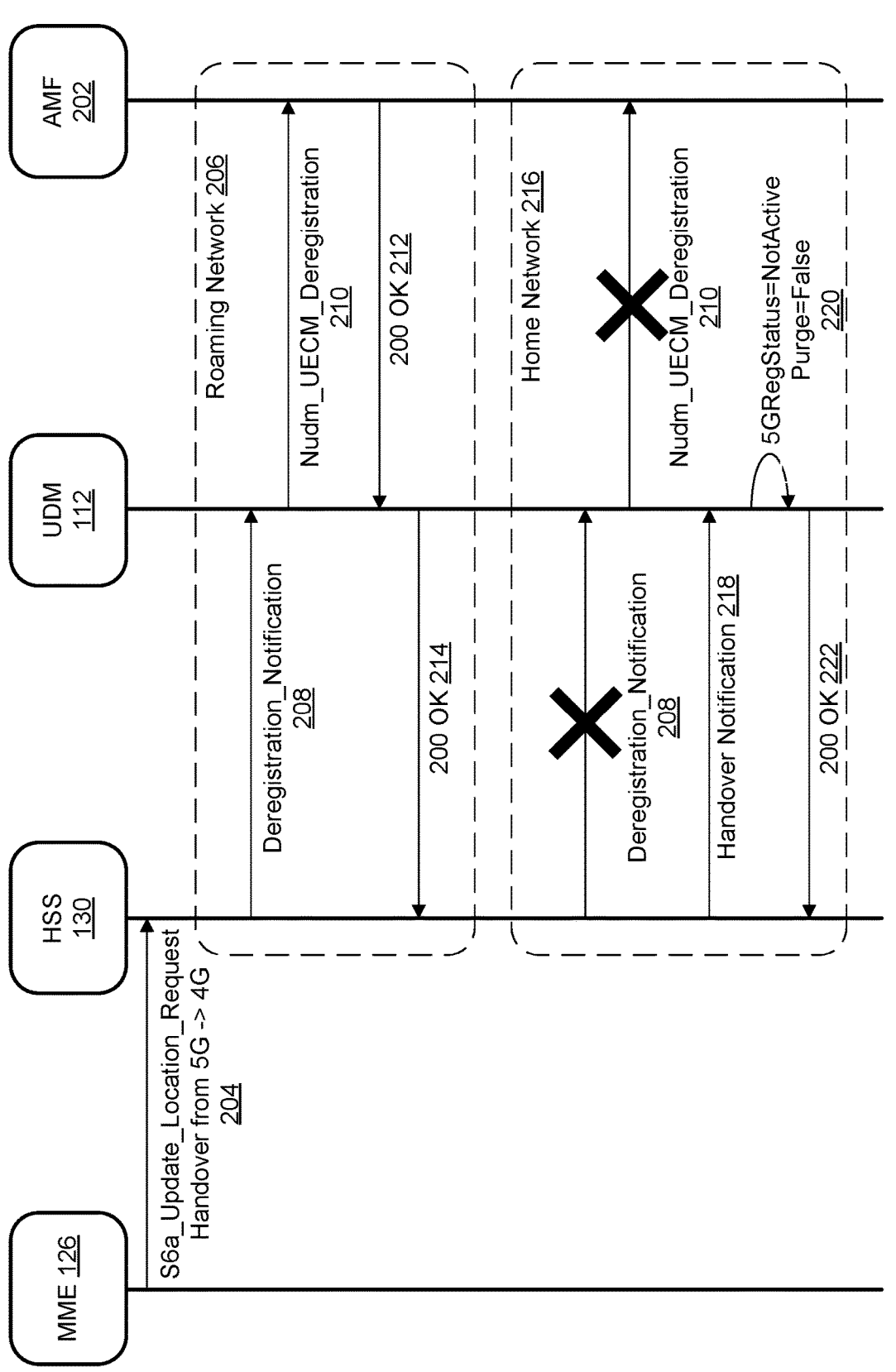
FIG. 2 is a message flow diagram showing a subset of core network nodes and the messages among these nodes and devices to suppress deregistration messaging to 5G core network nodes and allow retention by those nodes of information about a UE while the UE is on a 4G RAT.

FIG. 2 is a message flow diagram showing a subset of core network nodes and the messages among these nodes and devices to suppress deregistration messaging to 5G core network nodes and allow retention by those nodes of information about a UE while the UE is on a 4G RAT. As illustrated, a MME 126, a HSS 130, a UDM 112, and a AMF 202 exchange messages. The AMF 202 represents AMF 110, AMF 118, or any AMF of the pool 116 of AMFs. Also, the messages shown in FIG. 2 are in the context of a handover from 5G to 4G where the registration request is not for an initial registration.

As illustrated, the HSS 130 receives a S6a ULR message 204 from the MME 126 that notifies the HSS 130 of the handover of the UE 102 from 5G to 4G. The MME 126 may send the S6a ULR message 204 in response to receiving a registration request from the UE 102 through the 4G RAT 106. The MME 126 may also engage in a handshake with the AMF 202 over an N26 interface 128, causing the AMF 202 to extend a life of a session context of the UE 102 as stored by the AMF 202.

After receiving the S6a ULR message 204, the HSS 130 determines whether the UE 102 is on a roaming network 206 or a home network 216. The HSS 130 may determine whether the UE 102 is on a roaming network 206 or a home network 216 by examining a public land mobile network identifier (PLMN ID) of the 5G network handing over the UE 102 and determining whether the PLMN ID is a PLMN ID of a roaming network 206 or a home network 216.

When the HSS 130 determines that the UE 102 is on a roaming network 206, the HSS 130 sends a deregistration_notification 208 to the UDM 112, which in turn sends a Nudm_UECM_Deregistration message 210 to the AMF 202. In response to receiving the deregistration messages, the UDM 112 and AMF 202 may remove (or cease retaining) certain information about UE 102 (e.g., subscriber profile information). The AMF 202 may respond to the UDM 112 with a 200 OK message 212, and the UDM 112 may then respond to the HSS 130 with a 200 OK message 214. The communications between the UDM 112 and HSS 130 may be sent using a communication interface 134, which may be a 3GPP-defined interface or a proprietary interface. The communications between the UDM 112 and the AMF 202 may be sent using a N8 interface 114.

When the HSS 130 determines that the UE 102 is on a home network 216, the HSS 130 refrains from sending a deregistration_notification 208 to the UDM 112, resulting in the UDM 112 not sending a Nudm_UECM_Deregistration message 210 to the AMF 202. Instead, the HSS 130 sends a handover notification 218 to inform the UDM 112 of the handover of the UE 102 to 4G. At 220, in response to receiving the handover notification 218, the UDM 112 updates a 5G registration status to "not active" (e.g., sets 5GRegStatus=NotActive) but continues to maintain a 5G purge flag as set to false (e.g., 5GPurgeFlag=False) to continue retaining information associated with the UE 102, such as subscriber profile information. The UDM 112 then responds to the HSS 130 with a 200 OK 222. Also, upon receiving the handover notification 218, the UDM 112 retains dynamic data associated with the UE 102 (e.g., the subscriber profile information), either on itself or on a UDR while the 5G registration status is set to not active, and sets a timestamp associated with the 5G registration status.

In some implementations, the HSS 130 may not be configured to send a handover notification 218 and may send a deregistration_notification 208 regardless of whether the UE 102 is on a roaming network 206 or a home network 216. In such implementations, when the UDM 112 can determine that the UE 102 is on a home network 216, the UDM 112 may perform the update at 220, maintain the 5G purge flag, retain dynamic data/subscriber profile information, set the timestamp, and refrain from sending the Nudm_ UECM_Deregistration message 210 to the AMF 202—the UDM 112 may behave as if it received a handover notification 218 instead of a deregistration_notification 208.

Figure 3:
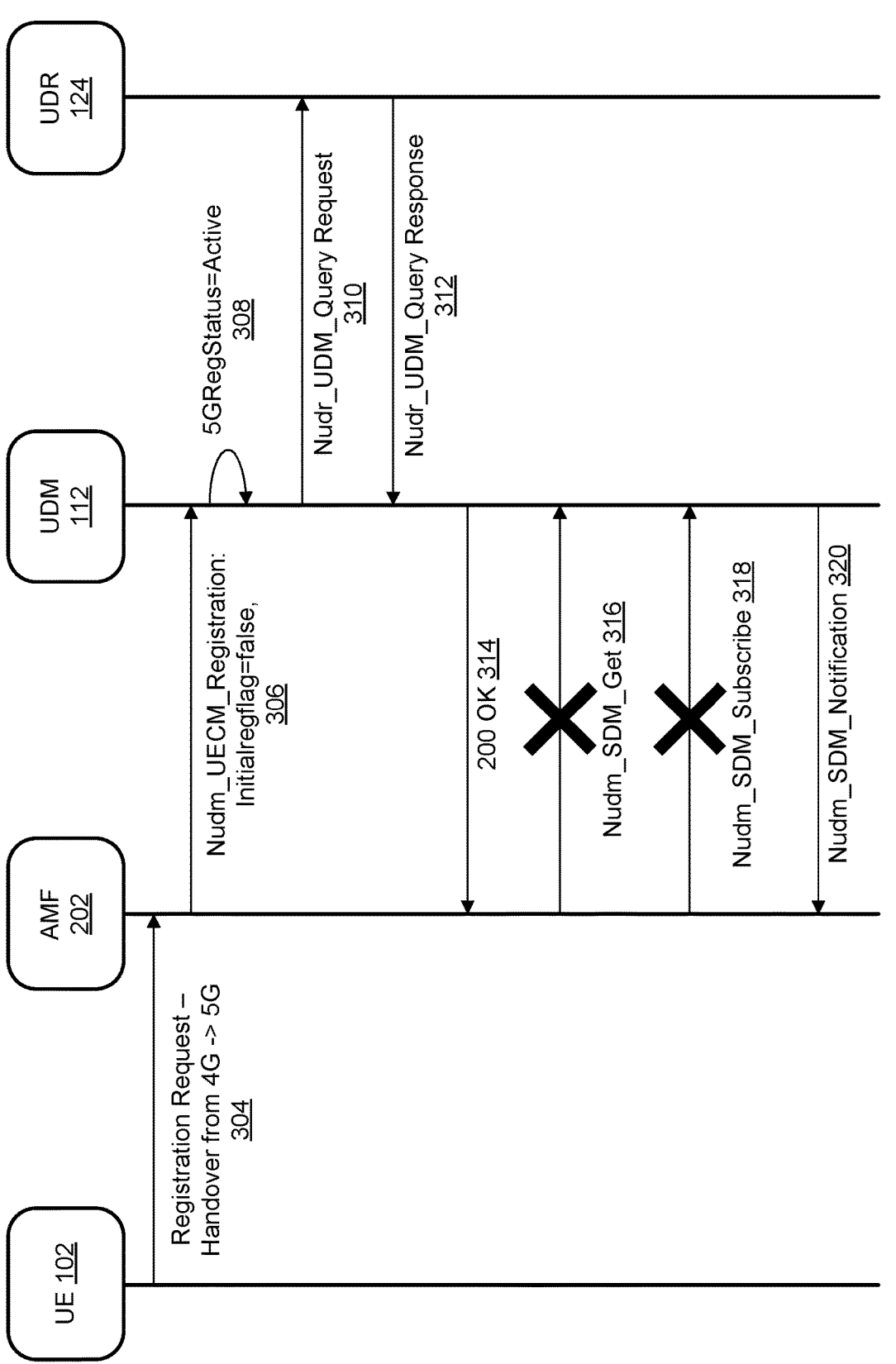
FIG. 3 is a message flow diagram showing a subset of core network nodes and the UE and the messages among these nodes and devices to optimize messaging between the AMF and UDM, refraining from both get messages and subscribe messages, in the context of a 4G to 5G handover that is not an initial registration.

FIG. 3 is a message flow diagram showing a subset of core network nodes and the UE and the messages among these nodes and devices to optimize messaging between the AMF and UDM, refraining from both get messages and subscribe messages, in the context of a 4G to 5G handover that is not an initial registration. As illustrated, a UE 102, AMF 202, UDM 112, and a UDR 124 exchange messages. The AMF 202 represents AMF 110, AMF 118, or any AMF of the pool 116 of AMFs.

In various implementations, the AMF 202 receives a registration request 304 from the UE 102. The registration request 304 is associated with a handover from 4G to 5G. Upon receiving the registration request 304, the AMF 202 determines whether the registration request 304 is for an initial registration. The AMF 202 may make this determination, for example, be checking to see if the AMF 202, another AMF in its pool of AMFs, or a UDSF associated with the AMF 202 maintains information from a prior registration. If such information is maintained, the AMF 202 determines that the registration request 304 is not for an initial registration. In other implementations, other determination techniques may be used—for example, the registration request 304 may include an indication of whether it is associated with an initial registration.

The AMF 202 also confirms that it retains the UE context information, the subscriber profile information, or both from a previous 5G registration.

After receiving the registration request 304, the AMF 202 sends a registration message 306, such as a Nudm_ UECM_Registration request message, to the UDM 112. Such a message 306 may be send over the N8 interface 114 between the AMF 202 and UDM 112. The registration message 306 may further include a flag (e.g., "initialreg-flag") set to true or false to indicate whether the registration associated with the registration request 304 is an initial registration. Such information may be used by the UDM 112 at 308 to set its own tracking information—such as a 5G registration status indication—to "active" or "inactive"- and to determine whether to expect further signaling (e.g., an update message). As shown in FIG. 3, when the handover is from 4G to 5G, the 5G registration status maintained by the UDM 112 is set to "active." Also, upon receiving the registration message 306, the UDM 112 makes no changes to the 5G purge flag (it remains set to "false") sets a registration timestamp associated with the 5G registration status.

In various implementations, the UDM 112 may then make a request 310 to the UDR 124 and receive a response 312 from the UDR 124, both in accordance with LDAP. The request 310 may be a Nudr_UDM_Query request 310 and the response 312 may be a Nudr_UDM_Query response 312. Such a request 310 and response 312 may retrieve subscriber profile information, store subscriber profile information, etc.

In some implementations, the UDM 112 also sends a de-registration notification to an HSS 130 in response to the registration message 306. The HSS 130, in response to the de-registration notification, sets a 4G purge flag to true on the UDR 124 and updates the UDR 124.

The UDM 112 may then send a response 314, such as a 200 OK, to the registration message 306 and may include information received in response 314 for use by the AMF 202 or other nodes of the core network 108. In some implementations, the response 314 may include UE context information, subscriber profile information, or both.

In further implementations, the AMF 202 does not send a get message 316, such as a Nudm_SDM_Get, as the get message would be redundant. It would seek to obtain for the AMF 202 the subscriber profile information, which the AMF 202 already has by virtue of the AMFs maintaining that information. The AMF 202 also does not send a subscribe message 318, such as a Nudm_SDM_Subscribe, as the UDM 112 is configured to provide updates to the AMFs without receiving subscription requests. By not sending the get message 316 and the subscribe message 318, two Nudm messages are avoided, as are the responses that would be associated with them. Any LDAP exchanges with the UDR associated with each Nudm would also be avoided. Thus, potentially eight signaling messages associated with UDM 112 may be avoided.

In various implementations, the UDM 112 sends a notification 320 of changes to the subscriber profile information, such as a Nudm_SDM_Notification, to the AMF 202. Such a notification would be the sort of information sought by a subscribe message 318, but in FIG. 3 it is provided automatically, without the subscribe message 318, to the AMF 202. The notification 320 may also include the updated subscriber profile information, which may be used by the AMF 202 to update itself, the UDSF, or both. Alternatively, the notification 320 may trigger retrieval, by the AMF 202, of the updated subscriber profile information from the UDM 112.

Figure 4:
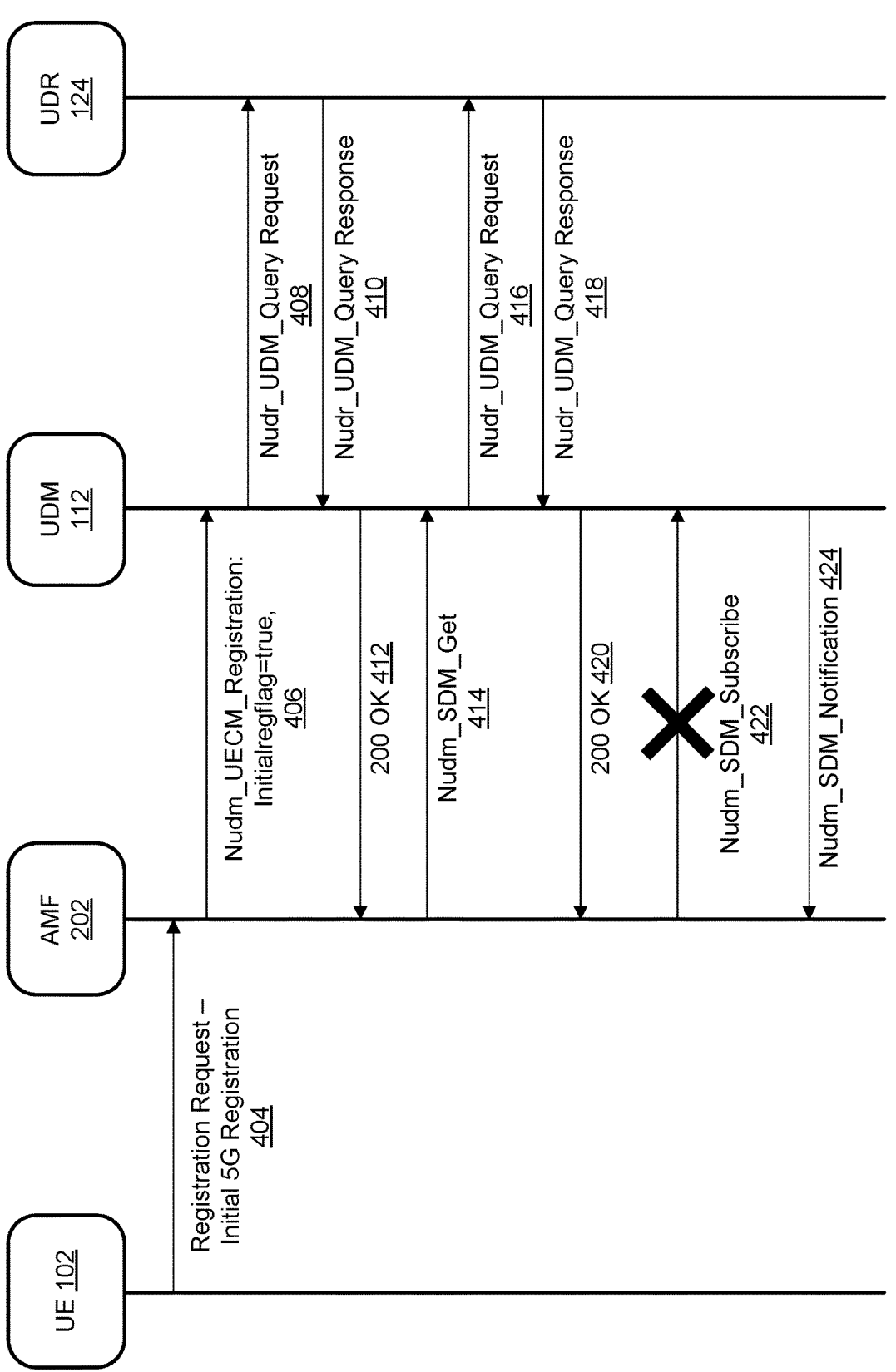
FIG. 4 is a message flow diagram showing a subset of core network nodes and the UE and the messages among these nodes and devices to optimize messaging between the AMF and UDM, refraining from subscribe messages, in the context of an initial 5G registration.

FIG. 4 is a message flow diagram showing a subset of core network nodes and the UE and the messages among these nodes and devices to optimize messaging between the AMF and UDM, refraining from subscribe messages, in the context of an initial 5G registration. As illustrated, a UE 102, AMF 202, UDM 112, and a UDR 124 exchange messages. The AMF 202 represents AMF 110, AMF 118, or any AMF of the pool 116 of AMFs.

In various implementations, the AMF 202 receives a registration request 404 from the UE 102. The registration request 404 is associated with an initial registration with a 5G network. Upon receiving the registration request 404, the AMF 202 determines whether the registration request 404 is for an initial registration. The AMF 202 may make this determination, for example, be checking to see if the AMF 202, another AMF in its pool of AMFs, or a UDSF associated with the AMF 202 maintains information from a prior registration. If such information is not maintained, the AMF 202 determines that the registration request 404 is for an initial registration. In other implementations, other determination techniques may be used—for example, the registration request 404 may include an indication of whether it is associated with an initial registration.

After receiving the registration request 404, the AMF 202 sends a registration message 406, such as a Nudm_UECM_Registration request message, to the UDM 112. Such a message 406 may be send over the N8 interface 114 between the AMF 202 and UDM 112. The registration message 406 may further include a flag (e.g., "initialreg-flag") set to true or false to indicate whether the registration associated with the registration request 404 is an initial registration. Such information may be used by the UDM 112 to set its own tracking information—such as a 5G registration status indication—to "active" or "inactive"- and to determine whether to expect further signaling (e.g., an update message). Also, upon receiving the registration message 406, the UDM 112 makes no changes to the 5G purge flag (it remains set to "false") sets a registration timestamp associated with the 5G registration status.

In various implementations, the UDM 112 may then make a request 408 to the UDR 124 and receive a response 410 from the UDR 124, both in accordance with LDAP. The request 408 may be a Nudr_UDM_Query request 408 and the response 410 may be a Nudr_UDM_Query response 410. Such a request 408 and response 410 may retrieve subscriber profile information, store subscriber profile information, etc.

The UDM 112 may then send a response 412, such as a 200 OK, to the registration message 406 and may include information received in response 412 for use by the AMF 202 or other nodes of the core network 108. In some implementations, the response 412 may include UE context information, subscriber profile information, or both.

In further implementations, the AMF 202 sends a get message 414 to UDM 112, such as a Nudm_SDM_Get, as the registration in FIG. 4 is an initial registration. The get message 414 may retrieve any subscriber information, such as UE context information, subscriber profile information, or both. Such information may not have been received at all or completely in the response 412, may have been updated, etc. Following the get message 414, the UDM 112 make a request 416 to the UDR 124 and receive a response 418 from the UDR 124, both in accordance with LDAP, and the request 416 may be a Nudr_UDM_Query request 416 and the response 418 may be a Nudr_UDM_Query response 418. Such a request 416 and response 418 may retrieve subscriber profile information, store subscriber profile information, etc. The UDM 112 may then send a response 420, such as a 200 OK, to the get message 414 and may include information received in response 420 for use by the AMF 202 or other nodes of the core network 108. In some implementations, the response 420 may include UE context information, subscriber profile information, or both.

In various implementations, the AMF 202 does not send a subscribe message 422, such as a Nudm_SDM_Subscribe, as the UDM 112 is configured to provide updates to the AMFs without receiving subscription requests. By not sending the subscribe message 422, a Nudm message is avoided, as is the response that would be associated with it. Any LDAP exchanges with the UDR associated with that Nudm message would also be avoided. Thus, potentially four signaling messages associated with UDM 112 may be avoided.

In various implementations, the UDM 112 sends a notification 424 of changes to the subscriber profile information, such as a Nudm_SDM_Notification, to the AMF 202. Such a notification would be the sort of information sought by a subscribe message 422, but in FIG. 4 it is provided automatically, without the subscribe message 422, to the AMF 202. The notification 424 may also include the updated subscriber profile information, which may be used by the AMF 202 to update itself, the UDSF, or both. Alternatively, the notification 424 may trigger retrieval, by the AMF 202, of the updated subscriber profile information from the UDM 112.

FIGS. 5-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 5 is a flow diagrams of an illustrative process at an AMF for suppressing deregistration messaging to 5G core network nodes and allowing retention by those nodes of information about a UE while the UE is on a 4G RAT. As illustrated at 502, an HSS receives a ULR from a MME of the 4G network, the ULR notifying the HSS of a handover of a UE from a 5G radio network to a 4G network At 504, the UDM receives a handover notification from the HSS as part of the handover. The handover notification is provided by the HSS in place of a de-registration notification based on the HSS determining that a PLMN ID of the 5G network belongs to a home network. In some implementations, the UDM may receive a de-registration notification but handle the de-registration notification as if it were a handover notification.

At 506, the UDM sets a 5G registration status to not active and keeps a 5G purge flag set to false.

At 508, based on the handover notification, the UDM refrains from sending a de-registration notification to an AMF of the 5G network.

At 510, the UDM retains dynamic data associated with the UE on a UDR of the 5G network while the 5G registration status is set to not active.

At 512, in response to the handover notification, the UDM sets a timestamp associated with the 5G registration status.

At 514, the AMF retains data and extends a life of a session context for the UE in response to a handshake with the MME of the 4G network indicating the handover to the 4G network.

At 516, the HSS receives a message indicating another handover of another UE from another 5G network to a 4G network, determines that a PLMN ID of the other 5G network belongs to a roaming network, and sends a de-registration notification to a UDM of the other 5G network. The UDM of the other 5G network may then send a de-registration message to an AMF of the other 5G network.

FIG. 6 is a flow diagrams of an illustrative process at an AMF for optimizing messaging between the AMF and UDM, including refraining from sending both get messages and subscribe messages to the UDM in the context of a 4G to 5G handover that is not an initial registration. As illustrated at 602, an AMF receives a registration request associated with a handover of a UE from a 4G network to a 5G network.

At 604, the AMF sends to a UDM a registration message, the registration message causing the UDM to set a 5G registration status to active. At 606, in response to the registration message, the UDM makes no change to a 5G purge flag. At 608, in response to the registration message, the UDM updates a registration timestamp. At 610, in response to the registration message, the UDM sends a de-registration notification to a HSS. The HSS, in response to the de-registration notification, sets a 4G purge flag to true on a UDR and updates the UDR.

At 612, the AMF determines that UE context information from a previous 5G registration is retained by the AMF or a UDSF shared by a pool of AMFs.

At 614, based on determining that UE context information from a previous 5G registration is retained, the AMF refrains from sending a get message to the UDM.

At 616, without sending a subscribe message to the UDM, the AMF receives, from the UDM, notification of changes to subscriber profile information from the previous 5G registration. In some implementations, the UDM sending the notification of changes to the AMF is triggered by a change of 5G registration status. Also, the UDM may track changes to the subscriber profile information and obtain an AMF identifier from information received from the AMF or stored by the UDR to enable the UDM to send the notification of changes to the AMF.

FIG. 7 is a flow diagrams of an illustrative process at an AMF for optimizing messaging between the AMF and UDM, including refraining from sending subscribe messages to the UDM in the context of an initial 5G registration. As illustrated at 702, an AMF receives an initial registration request for a UE connecting through a 5G network.

At 704, the AMF sends a registration message and a get message to a UDM. At 706, in response to the registration message, the UDM sets a 5G registration status in a UDR to active. At 708, also in response to the registration message, the UDM updates a registration timestamp in the UDR.

At 710, the UDM derives an AMF identifier from information received from the AMF or stored by the UDR.

At 712, the AMF or a UDSF shared by a pool of AMFs retains UE context information received in responses to the registration message and the get message.

At 714, without sending a subscribe message to the UDM, the AMF receives, from the UDM, notification of changes to subscriber profile information associated with the UE.

Figure 8:
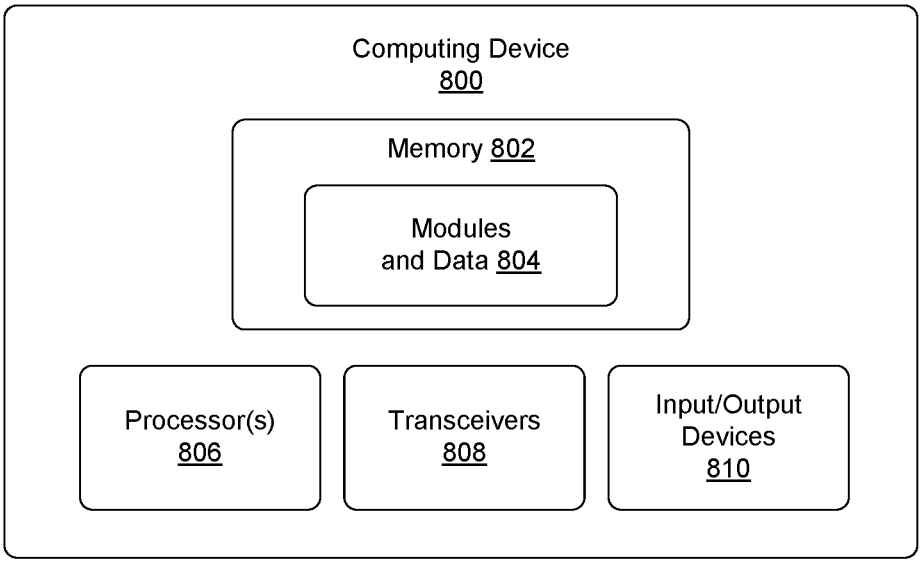
FIG. 8 is a schematic diagram of a computing device capable of implement functionality of one or more nodes of the core network.

FIG. 8 is a schematic diagram of a computing device capable of implement functionality of one or more nodes of the core network. As shown, the computing device 800 includes a memory 802 storing modules and data 804, processor(s) 806, transceivers 808, and input/output devices 810.

In various examples, the memory 802 can include system memory, which may be volatile (such as RAM), non-volatile (such as ROM, flash memory, etc.) or some combination of the two. The memory 802 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 802 can include one or more software or firmware elements, such as computer-readable instructions that are executable by the one or more processors 806. For example, the memory 802 can store computer-executable instructions associated with modules and data 804. The modules and data 804 can include a platform, operating system, and applications, and data utilized by the platform, operating system, and applications. Further, the modules and data 804 can implement any of the functionality for the AMF 110, the AMF 118, the UDM 112, the UDR 124, the MME 126, the HSS 130, the UE 102, or any other node/device described and illustrated herein.

In various examples, the processor(s) 806 can be a central processing unit (CPU), a graphics processing unit (GPU), or both CPU and GPU, or any other type of processing unit. Each of the one or more processor(s) 806 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 806 may also be responsible for executing all computer applications stored in the memory 802, which can be associated with types of volatile (RAM) and/or nonvolatile (ROM) memory.

The transceivers 808 can include modems, interfaces, antennas, Ethernet ports, cable interface components, and/or other components that perform or assist in exchanging wireless communications, wired communications, or both.

While the computing device need not include input/output devices 810, in some implementations it may include one, some, or all of these. For example, the input/output devices 810 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 810 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 810 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A method comprising:

receiving, by a unified data management node (UDM), a handover notification from a home subscriber server (HSS) as part of a handover of a user equipment (UE) from a fifth generation (5G) radio network to a fourth generation (4G) network;

setting, by the UDM, a 5G registration status to not active and keeping a 5G purge flag set to false;

based on the handover notification, refraining, by the UDM, from sending a de-registration notification to an access and mobility management function (AMF) of the 5G network, wherein the handover notification is provided by the HSS in place of the de-registration notification based on the HSS determining that a public land mobile network identifier (PLMN ID) of the 5G network belongs to a home network.

2. The method of claim 1, wherein the HSS receives a message indicating another handover of another UE from another 5G network to a 4G network, determines that a PLMN ID of the other 5G network belongs to a roaming network, and sends a de-registration notification to a UDM of the other 5G network.

3. The method of claim 2, wherein the UDM of the other 5G network sends a de-registration message to an AMF of the other 5G network.

4. The method of claim 1, wherein the HSS receives an update location request (ULR) from a mobility management entity (MME) of the 4G network, the ULR notifying the HSS of the handover.

5. The method of claim 1, further comprising retaining dynamic data associated with the UE on a unified data repository (UDR) of the 5G network while the 5G registration status is set to not active.

6. The method of claim 1, further comprising setting, by the UDM, a timestamp associated with the 5G registration status in response to the handover notification.

7. The method of claim 1, wherein the AMF retains data and extends a life of a session context for the UE in response to a handshake with a mobility management entity (MME) of the 4G network indicating the handover to the 4G network.

8. The method of claim 1, wherein receiving the handover notification comprises:

receiving, by the UDM, a de-registration message instead of the handover notification; and handling the de-registration message as if it were the handover notification, the handling including performing:

the setting of the 5G registration status to not active, the keeping the 5G purge flag set to false, and the refraining from sending the de-registration notification to the AMF.

* * * * *